No. 886,664. PATENTED MAY 5, 1908.
T. F. TALBOTT.
FODDER CART.
APPLICATION FILED AUG. 2, 1907.
2 SHEETS—SHEET 2.
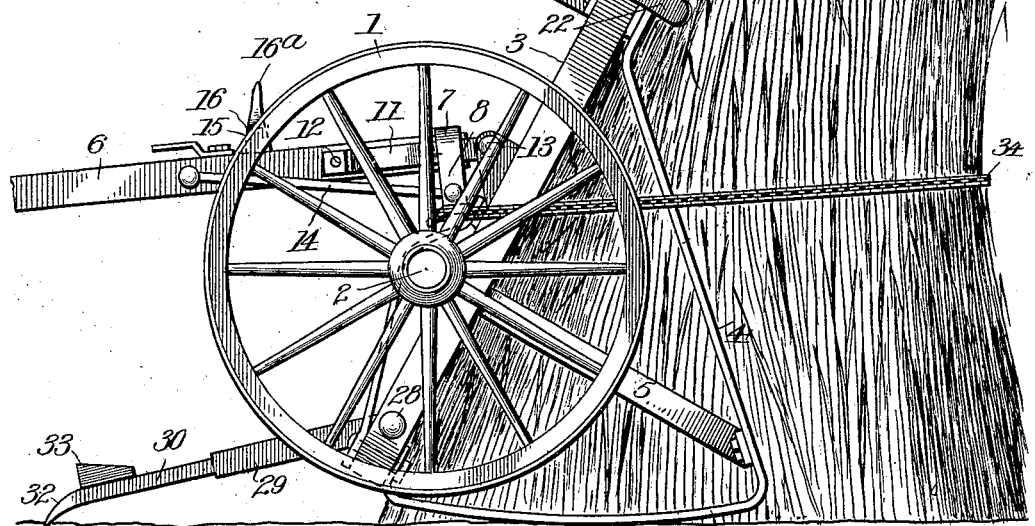
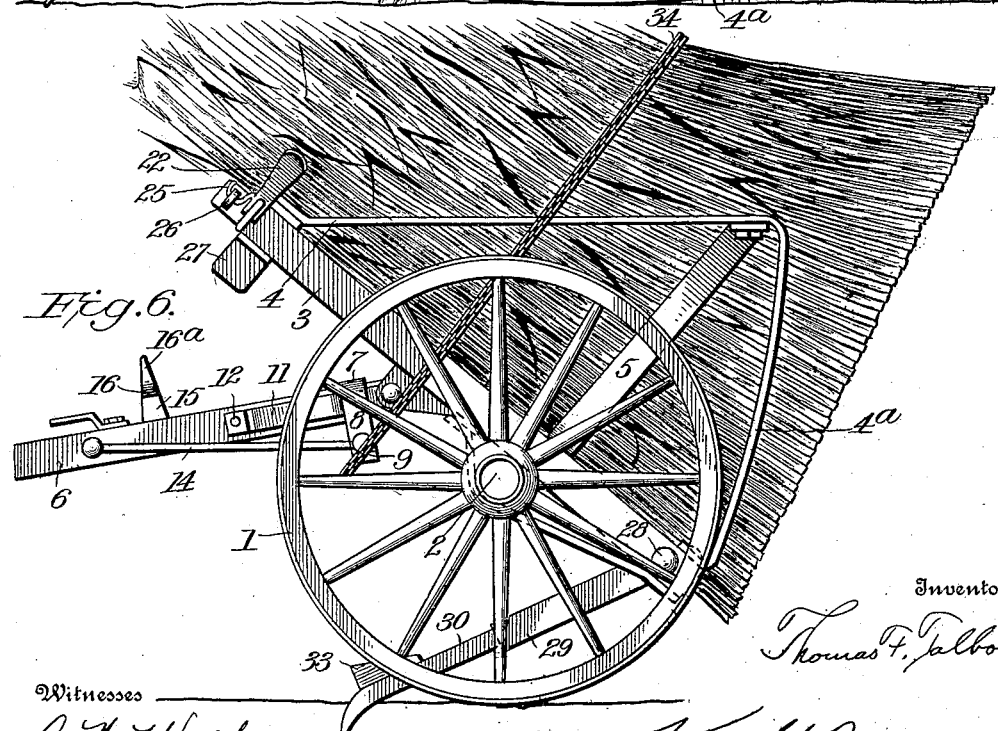

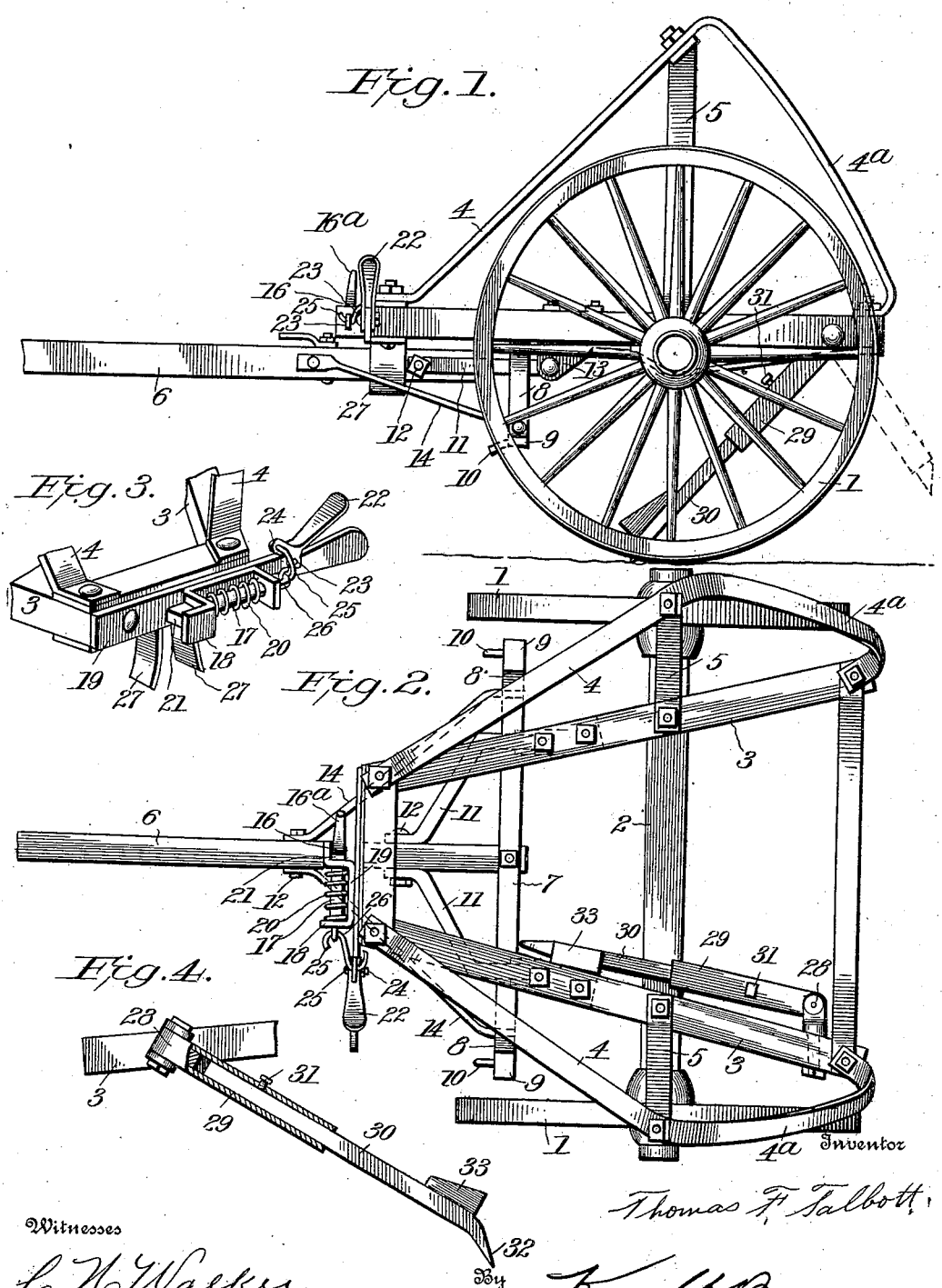

UNITED STATES PATENT OFFICE.

THOMAS F. TALBOTT, OF HARRISTOWN, ILLINOIS.

FODDER-CART.

No. 886,664.     Specification of Letters Patent.     Patented May 5, 1908.

Application filed August 2, 1907. Serial No. 386,848.

*To all whom it may concern:*

Be it known that I, THOMAS F. TALBOTT, a citizen of the United States, residing at Harristown, in the county of Macon and State of Illinois, have invented certain new and useful Improvements in Fodder-Carts, of which the following is a specification.

The present invention relates to fodder carts and an object of the invention is to provide an improved fodder cart by means of which the fodder can be hauled in the shock from the field, the shock being retained intact or in shape as it was in the field.

A further object of the invention is to provide means whereby the cart can be tilted to receive the shock and returned to normal position when loaded.

Other and further objects of the invention will appear from the description and will be more particularly pointed out in the claims.

One embodiment of the invention is shown in the accompanying drawings, by the way of example.

Figure 1 is a side view of the cart with the anchor bar dropped down on the ground, prior to the tilting of the cart; Fig. 2 is a plan view of the cart with the anchor bar resting on the axle of the cart; Fig. 3 is a perspective detail view of the locking mechanism; Fig. 4 is a detail view, partly in section, of the anchor bar; Fig. 5 is a side view showing the cart tilted against a shock, and Fig. 6 shows the loaded cart partially returned to normal position.

1 designates the wheels of the cart, 2 the axle, 3 the bottom frame secured to the axle and 4 the side frames secured at the front and rear to the bottom frame and having curved rear edges 4ª, and 5 designates braces connecting the side frames to the bottom frame intermediate of its ends. The bottom frame and side frames form the body of the cart which is open at the front and at the rear.

6 is the tongue or other suitable draft member, on the rear end of which is secured a cross-bar 7 provided with downwardly extending arms 8 having outwardly bent ends 9 which carry forwardly and downwardly projecting pins 10.

11 are yoke members which have their forward ends secured together and to the tongue 6 by means of a bolt 12 passing through the tongue. The rear ends of the yoke members are secured to the cross-piece 7 and are journaled in ears 13 secured to the bottom frame 3 in front of the axle 2. Braces 14 connect the arms 8 to the tongue 6. On the tongue is secured a keeper 15 having a shoulder 16 and a rearwardly curved upper part 16ª and on the front of the bottom frame is secured a locking mechanism normally engaging with the keeper to secure the tongue to the frame of the cart. The locking device comprises a bolt 17 mounted to slide in a bracket 18 secured to a plate 19 attached to the frame 3. A spring 20 tends to hold the bolt 17 in the projected position in which a head 21 on the front end of the bolt engages beneath the shoulder 16 on the keeper 15.

22 is an operating lever which is pivoted at 23 to the plate 19 and is provided with a forwardly projecting eye 24 which by means of an S hook 25 is connected with an eye 26 on the rear end of the bolt 17.

27 are guide arms projecting downwardly from the front part of the bottom frame 3, one on either side of the tongue 6.

An anchor bar is connected to the rear part of the bottom frame 3 through the medium of a swivel connection 28. The anchor bar is preferably made adjustable relatively to the frame and may for that purpose comprise an upper portion in the form of a sleeve 29 and a lower portion 30 projecting into the sleeve and capable of adjustment longitudinally in the sleeve. The portion 30 is secured in position by means of a screw 31 or the like. The lower portion of the anchor bar is formed with a downwardly curved point 32 and a stop 33 is provided to prevent the bar from penetrating too far into the ground.

34 is a chain adapted to be secured to the pins 10 to hold the shock on the body of the cart.

The mode of operation of my cart is as follows:—The normal position of the cart is shown in Figs. 1 and 2, the body of the cart being secured to the tongue by means of the locking device which has its bolt 17 engaging below the shoulder 16 of the keeper 15. The anchor bar which can be swung in any direction by means of the swivel connection 28 rests on the axle of the cart as shown in Fig. 2 or trails behind the cart as shown in dotted lines in Fig. 1. When it is desired to load the cart, the cart is backed up by the horses close to the shock of fodder in the field, the chain 34 being removed. When the cart is in the proper position the anchor bar is dropped on the ground pointing towards the team, as shown in full lines in Fig. 1, or if the anchor bar trails behind the cart, it is swung from the position shown in dotted lines to the position shown in full lines in Fig. 1. The driver then chocks the wheels and unlocks the frame from the tongue by depressing the hand lever 22 which causes the head of the bolt 17 to be withdrawn from the keeper on the tongue. The cart is then backed slowly up against the shock, and as the tongue is pivotally connected to the bottom frame of the cart in front of the axle through the medium of the yoke members 11 and ears 13 the pressure exerted by the tongue on the body of the cart will cause the frame and the axle to swing on the wheels, which, as above mentioned, are chocked, and the body of the cart will be folded or tilted backwardly into the position shown in Fig. 5. During the tilting movement of the cart body the lower end of the curved edges of the side frames will first touch the ground and support the cart body and when the cart is further tilted the cart body will rock on the curved edges 4$^a$ and the wheels 1 will be elevated from the ground. The anchor bar then assumes the position shown in Fig. 5. The driver then hooks one end of the chain 34 to one of the pins 10, draws the chain firmly around the shock and hooks the other end of the chain to the other pin 10. If necessary, the chain can be more firmly tightened by dropping the chain between the spokes of the wheel, thus using the wheel as a lever. The driver then makes sure that the anchor bar is in position to stick in the ground without slipping and he thereupon starts his horses out straight which will cause the anchor bar to become firmly embedded in the ground and during the forward movement of the cart, the anchor bar will raise the rear end of the cart body which will thus be folded back to its normal position shown in Fig. 1 and the anchor bar will trail behind the cart. At the end of the return movement of the cart body the head of the bolt 17 hits the upper part of the keeper 15 and is forced back thereby to be again projected by the spring 20 after passing the shoulder 16, and the cart body is thus locked in position and firmly connected to the tongue 6. During the return movement of the cart body the chain 34 will be tightened around the shock as the pins 10, to which the chain is secured, are nearer to the cart body, and to the axle in the loading position (Fig. 5) than in the normal position (Fig. 1) of the cart, that is to say, the bottom frame of the cart swings gradually farther away from the attaching points of the chain and the shock thus becomes firmly secured to the cart. When it is desired to unload or reset the fodder the driver unlocks the cart by means of the lever 22 and the weight of the shock will then cause the cart body to tilt back. The driver may gently back his team until the shock stands erect and then unfasten the chain, and when the team is subsequently started, the cart will resume its normal position.

By means of my improved cart, the fodder can be hauled in the shock from the field and the shock can be retained intact or in shape as a whole as it was in the field, that is to say, the shock can be transferred from one part of the farm to another, where it can be set up again without being torn to pieces, or it can be scattered and fed in the feed lot from the cart. This means a great saving in labor and the work is all done by one horse or a team and the driver has nothing to do but to hitch, drive and unhitch, except when the fodder is to be fed from the cart. The fodder is also kept in better condition than when hauled in the old way.

The cart is preferably made entirely from steel but may be made from steel and wood. The anchor bar is made adjustable so that it can be shortened and lengthened to suit the position of the cart or the condition of the ground. The cart may be constructed with shafts for one horse or with tongue for two horses and is open at the front and rear so as to permit of the bottom frame being moved into close proximity to the shock. The wheels 1 extend approximately to the extreme rear end of the bottom frame 3 and the curved edges 4$^a$, which extend from the extreme rear end of the bottom frame, are eccentric to the axle and the radius of the curvature of the edges 4$^a$ is greater than the radius of the wheels so as to provide for the wheels being elevated from the ground when the cart is tilted to the position shown in Fig. 5.

Having thus described my invention, what I claim and desire to secure by Letters Patent is:

1. The combination of the tilting cart body, the draft member swingingly connected thereto, means for securing a load on the cart body while in tilted position, and means carried by the draft member and adapted to engage the securing means and automatically tighten the same when the cart is returned from its tilted position.

2. A cart having a tilting body open at the front and rear and provided with side frames with curved rear edges.

3. A cart having a tilting body open at the front and rear and provided with side frames with curved rear edges extending from the extreme rear end of the body and wheels extending approximately to the extreme rear end of the body.

4. A cart having a tilting body open at the front and rear and provided with side frames with curved rear edges extending from the extreme rear end of the body and wheels extending approximately to the extreme rear end of the body, the radius of the curvature of said edges being greater than the radius of the wheels.

5. A cart having a tilting body, a draft member swingingly connected to said body in front of the axis about which the body tilts, and an anchor bar connected to the rear of the body and adapted to enter the ground to raise the rear part of the body when a pull is exerted on said draft member.

The foregoing specification signed at Decatur, Illinois this eight day of February, 1907.

THOMAS F. TALBOTT.

In presence of—
  C. E. SCHROLL,
  T. L. EVANS,